US010037025B2

(12) United States Patent
Pallath et al.

(10) Patent No.: US 10,037,025 B2
(45) Date of Patent: Jul. 31, 2018

(54) DETECTING ANOMALIES IN AN INTERNET OF THINGS NETWORK

(71) Applicant: BUSINESS OBJECTS SOFTWARE LTD., Dublin (IE)

(72) Inventors: Paul Pallath, Naas (IE); Rouzbeh Razavi, Dublin (IE)

(73) Assignee: Business Objects Software Ltd., Dublin (IE)

(*) Notice: Subject to any disclaimer, the term of this patent is extended or adjusted under 35 U.S.C. 154(b) by 109 days.

(21) Appl. No.: 14/877,764

(22) Filed: Oct. 7, 2015

(65) Prior Publication Data
US 2017/0102978 A1 Apr. 13, 2017

(51) Int. Cl.
G06F 11/00 (2006.01)
G05B 23/02 (2006.01)
H04L 29/08 (2006.01)

(52) U.S. Cl.
CPC .............. *G05B 23/02* (2013.01); *H04L 67/12* (2013.01)

(58) Field of Classification Search
CPC .................................................. G06F 11/079
See application file for complete search history.

(56) References Cited

U.S. PATENT DOCUMENTS 7,650,644 B2    1/2010  Cheng et al.
7,734,764 B2 *  6/2010  Weiner ................ G06F 19/3412
                                                          705/2
8,056,091 B2   11/2011  Brunswig et al.
8,417,715 B1    4/2013  Bruckhaus et al.
8,473,431 B1    6/2013  Mann et al.
8,650,065 B2 *  2/2014  Carr ........................ G06Q 30/02
                                                        705/7.31
8,683,592 B1 *  3/2014  Dotan ..................... G06F 21/552
                                                          709/224
8,719,636 B2 *  5/2014  Yabuki ................ G06F 11/0754
                                                           714/26
9,009,175 B2    4/2015  Sitt
9,274,869 B2 *  3/2016  Yabuki ................ G06F 11/0754
2008/0016412 A1* 1/2008  White .................. G06F 11/3409
                                                           714/48
2011/0099045 A1* 4/2011  Carr ........................ G06Q 30/02
                                                        705/7.31

(Continued)

OTHER PUBLICATIONS

U.S. Appl. No. 14/662,502, Pallath et al., filed Mar. 19, 2015.

(Continued)

*Primary Examiner* — Christopher S McCarthy
(74) *Attorney, Agent, or Firm* — Fish & Richardson P.C.

(57) ABSTRACT

The present disclosure describes methods, systems, and computer program products for detecting anomalies in an Internet-of-Things (IoT) network. One computer-implemented method includes receiving, by operation of a computer system, a dataset of a plurality of data records, each of the plurality of data records comprising a plurality of features and a target variable, the plurality of features and target variable including information of a manufacturing environment; identifying a set of normal data records from the dataset based on the target variable; identifying inter-feature correlations by performing correlation analysis on the set of normal data records; and detecting anomaly based on the inter-feature correlations for predictive maintenance.

17 Claims, 5 Drawing Sheets

(56) References Cited

U.S. PATENT DOCUMENTS

| | | | |
|---|---|---|---|
| 2012/0030522 A1* | 2/2012 | Yabuki | G06F 11/0754 |
| | | | 714/47.1 |
| 2014/0156401 A1* | 6/2014 | Carr | G06Q 30/02 |
| | | | 705/14.53 |
| 2014/0208293 A1 | 7/2014 | Pusz et al. | |
| 2014/0303953 A1 | 10/2014 | Bates | |
| 2015/0019553 A1* | 1/2015 | Shaashua | G06F 17/30705 |
| | | | 707/737 |
| 2017/0041813 A1* | 2/2017 | Reed | H04W 8/02 |

OTHER PUBLICATIONS

U.S. Appl. No. 14/794,398, Pallath et al., filed Jul. 8, 2015.
U.S. Appl. No. 15/185,951, Wu, et al., filed Jun. 17, 2016.
U.S. Appl. No. 15/364,681, Pallath, et al., filed Nov. 30, 2016.

* cited by examiner

| Sensor 1 | Sensor 2 | Sensor 3 | Sensor 4 | Sensor 5 | Sensor 6 | Target |
|---|---|---|---|---|---|---|
| 9.792568 | 0.002249 | 4.021518 | 0.560023 | 65.59978 | -145.511 | Ok |
| 1.607866 | 0.004612 | 4.372296 | 0.511397 | 61.27633 | -155.668 | Ok |
| 8.601823 | 0.006211 | 4.517952 | 0.852105 | 60.73568 | -147.899 | Ok |
| 6.284256 | 0.00617 | 4.855949 | 0.606847 | 64.85713 | -147.029 | Ok |
| 9.254439 | 0.007887 | 4.247111 | 0.748306 | 63.71346 | -141.049 | Ok |
| 0.291447 | 0.007916 | 4.826016 | 0.409943 | 64.8187 | -160.691 | Ok |
| 4.561445 | 0.007359 | 4.561308 | 0.725387 | 62.94305 | -157.184 | Ok |
| 0.869112 | 0.00912 | 4.287177 | 0.437474 | 64.09635 | -142.913 | Ok |
| 4.87361 | 0.006737 | 4.677179 | 0.215548 | 61.83719 | -157.686 | Ok |
| 9.596527 | 0.009663 | 4.483568 | 0.283931 | 62.49224 | -166.973 | Fail |
| 6.421844 | 0.00367 | 4.090473 | 0.971115 | 60.63958 | -167.545 | Ok |
| 0.64251 | 0.000852 | 4.358391 | 0.927834 | 62.1852 | -131.26 | Ok |
| 4.155596 | 6.59E-05 | 4.66537 | 0.471633 | 62.60612 | -140.65 | Ok |
| 2.118874 | 0.003394 | 4.658373 | 0.594522 | 61.78444 | -135.226 | Ok |
| 6.177111 | 0.002122 | 4.434371 | 0.248992 | 62.97766 | -150.33 | Ok |
| 4.577937 | 0.009283 | 4.593687 | 0.157006 | 62.80552 | -139.706 | Fail |
| 8.637066 | 0.007405 | 4.84827 | 0.748594 | 60.98235 | -133.193 | Ok |
| 6.965282 | 0.006617 | 4.909174 | 0.8463 | 63.22521 | -146.795 | Ok |
| 5.682633 | 0.001959 | 4.06478 | 0.450742 | 61.8187 | -152.977 | Ok |
| 1.703428 | 0.005019 | 4.917891 | 0.428734 | 62.35919 | -137.617 | Ok |

FIG. 1

DETECTING ANOMALIES IN AN INTERNET OF THINGS NETWORK

BACKGROUND

The Internet-of-Things (IoT), or the Internet of Everything, is a network of physical objects or "things" that can be segmented into, for example, wearables, connected cars, connected homes, connected cities, and industrial Internet/networks. A large amount of data can be quickly generated in each of these segments and can be used to improve lives of both individuals and groups/organizations, especially if useful information/actionable insights can be "learned" or "discovered" in real-time for maximum impact.

In many manufacturing contexts, knowledge empowers preservation of valuable heritage, new learning, solving intricate problems, creating core competencies, and initiating new situations for both individuals and organizations now and in the future. In most sectors, manufacturing can be extremely competitive. Financial margins that differentiate between success and failure are very tight, with most established industries needing to compete, produce, and sell at a global level. To master these trans-continental challenges, an organization must achieve low-cost production yet still maintain highly skilled, flexible, and efficient workforces that are able to consistently design and produce high-quality and low-cost products.

In modern manufacturing, the volume of data grows at an unprecedented rate in digital manufacturing environments with the use of barcodes, sensors, vision systems, etc. This data may be, for example, related to design, products, machines, processes, materials, inventories, maintenance, planning and control, assembly, logistics, performances, etc., and may include patterns, trends, associations, and dependencies. However, the use of accumulated data has been limited, which has led to what may be called a "rich data but poor information" problem.

The huge amounts of data stored in manufacturing databases, which often contain large numbers of records with many attributes that need to be simultaneously explored/analysed to discover useful information, make manual analysis impractical. All these factors indicate the need for intelligent and automated data analysis methodologies that discover/reveal useful knowledge from data. Knowledge discovery in databases (KDD) and data mining (DM) have therefore become important tools in realizing an objective of intelligent and automated data analysis.

SUMMARY

The present disclosure relates to computer-implemented methods, computer-readable media, and computer systems for detecting anomalies in an Internet-of-Things (IoT) network. One computer-implemented method includes receiving, by operation of a computer system, a dataset of a number of data records, each of the number of data records including a number of features and a target variable, the number of features and target variable including information of a manufacturing environment; identifying a set of normal data records from the dataset based on the target variable; identifying inter-feature correlations by performing correlation analysis on the set of normal data records; and detecting anomaly based on the inter-feature correlations for predictive maintenance.

The foregoing and other implementations can each optionally include one or more of the following features, alone or in combination.

A first aspect, combinable with the general implementation, wherein detecting anomaly further includes detecting a data record to be an abnormal data record in response to determining that a number of previous time stamped data records are determined as abnormal data records.

A second aspect, combinable with any of the previous aspects, wherein detecting anomaly using the inter-feature correlations for predictive maintenance includes: identifying a cluster of correlated features based on the inter-feature correlations; building a model that estimates a first feature in the cluster of correlated features based on one or more other features in the cluster of correlated features; receiving a data record that includes an observed value of the first feature and observed values of the one or more other features in the cluster of correlated features; determining an estimated value of the first feature according to the model based on the values of the one or more other features in the cluster of correlated features; comparing the estimated value of the first feature with the observed value of the first feature; and determining whether the data record is a normal data record or an abnormal data record based on the comparison.

A third aspect, combinable with any of the previous aspects, wherein determining whether the data record is a normal data record or an abnormal data record based on the comparison includes determining a probability of anomaly of the data record based on the comparison.

A fourth aspect, combinable with any of the previous aspects, wherein comparing the estimated value of the first feature with the observed value of the first feature includes computing an error measure between the estimated value of the first feature with the observed value of the first feature.

A fifth aspect, combinable with any of the previous aspects, further including: building an impact model that represents a relationship between the target variable and the respective error measure of each feature in the cluster of correlated features; and identifying impact of a deviation from an estimated value of a feature in the cluster of correlated features on the target variable.

A sixth aspect, combinable with any of the previous aspects, wherein determining whether the data record is a normal data record or an abnormal data record based on the comparison includes: increasing a probability of anomaly of the data record in response to determining the error measure between the estimated value of the first feature with the observed value of the first feature exceeds a threshold.

A seventh aspect, combinable with any of the previous aspects, further including: for each feature besides the first feature in the cluster of correlated features: building a respective model that estimates the feature based on one or more features other than the feature in the cluster of correlated features; determining an estimated value of the feature according to the respective model based on observed values of the one or more other features other than the feature in the cluster of correlated features; comparing the estimated value of the feature with the observed value of the feature; and determining whether the data record is a normal data record or an abnormal data record based on the comparison.

A eighth aspect, combinable with any of the previous aspects, further including: identifying a second cluster of correlated features based on the inter-feature correlations of the set of normal data records; building a second model that determines a second feature in the second cluster of correlated features based on one or more other features in the second cluster of correlated features; receiving a second data record that includes an observed value of the second feature and observed values of the one or more other features in the second cluster of correlated features; determining an estimated value of the second feature based on the values of the one or more other features in the second cluster of correlated features; comparing the estimated value of the second feature with the observed value of the second feature; and determining whether the data record is a normal data record or an abnormal data record based on the comparison.

A ninth aspect, combinable with any of the previous aspects, wherein determining whether the data record is a normal data record or an abnormal data record includes determining that the data record is an abnormal data record in response to determining that at least one of: the observed value of the first feature is outside a first tolerance range of the estimated value of the first feature; or the observed value of the second feature is outside a second tolerance range of the estimated value of the second feature.

Example techniques described here can help identify abnormities even if the abnormity is a rare event. The example techniques can improve prediction accuracy and give rise to simpler and more accurate models. The example techniques can provide flexibility, scalability, and performance gains such as saving in computation time. The example techniques can be performed sequentially or in parallel. The example techniques can be implemented in a distributed fashion, leveraging parallel processing. The example techniques can achieve additional or different advantages.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

FIG. 1 is a table illustrating an example dataset including multiple data records for detecting anomalies in an Internet-of-Things (IoT) network according to an implementation.

Like reference numbers and designations in the various drawings indicate like elements.

DETAILED DESCRIPTION

Figure 2:
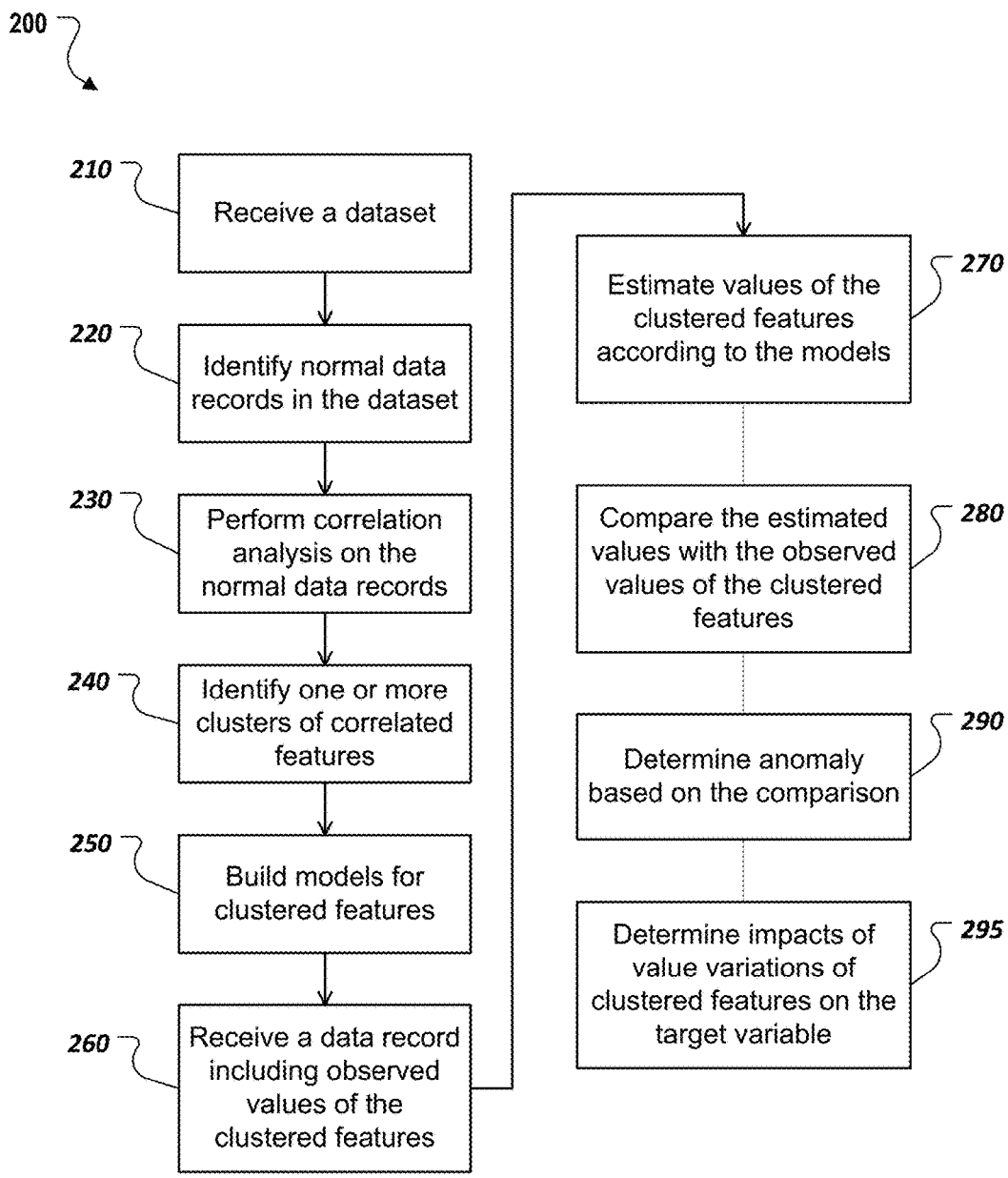
FIG. 2 is a flow chart illustrating a method for detecting anomalies in an IoT network according to an implementation.

The following detailed description is presented to enable a person skilled in the art to make, use, and/or practice the disclosed subject matter, and is provided in the context of one or more particular implementations. Various modifications to the disclosed implementations will be readily apparent to those skilled in the art, and the general principles defined herein may be applied to other implementations and applications without departing from the scope of the disclosure. Thus, the present disclosure is not intended to be limited to the described and/or illustrated implementations, but is to be accorded the widest scope consistent with the principles and features disclosed herein.

For the purposes of this disclosure, the terms "real-time," "real time," "realtime," "real (fast) time (RFT)," "near(ly) real-time (NRT)," "quasi real-time," or similar terms (as understood by one of ordinary skill in the art) mean that an action and a response are temporally proximate such that an individual perceives the action and the response occurring substantially simultaneously. For example, the time difference for a response to display (or for an initiation of a display) of data following the individual's action to access the data may be less than 1 ms, less than 1 sec., less than 5 secs., etc. While the requested data need not be displayed (or initiated for display) instantaneously, it is displayed (or initiated for display) without any intentional delay, taking into account processing limitations of a described computing system and time required to, for example, gather, accurately measure, analyze, process, store, and/or transmit the data.

Predictive maintenance is an example key use case in the age of the Internet-of-Things (IoT). Information about the functioning of machines can be obtained from multiple sensors that monitor activities and status of the machines. Data mining algorithms can be applied in manufacturing, especially in predictive maintenance. For example, from the sensor readings, it is possible to evaluate if there is an approaching risk of failure so as to quickly act before the issue actually happens. The aim of predictive maintenance can include: 1) predicting when equipment failure might occur; and 2) preventing occurrence of the failure by performing required maintenance. The task of monitoring for future failure allows maintenance to be planned before the failure occurs. Ideally, predictive maintenance allows the maintenance frequency to be as low as possible to prevent unplanned reactive maintenance, without incurring costs associated with doing too much preventative maintenance.

Many techniques for predicting failure can be used. Desired techniques are effective at both predicting failure and providing sufficient warning time for maintenance to be planned and executed. The techniques can include, for example, vibration analysis, oil analysis, thermal imaging, and equipment observation. Choosing a suitable technique for performing condition monitoring is an important consideration that is best done in consultation with equipment manufacturers and condition monitoring experts. When predictive maintenance is working effectively as a maintenance strategy, maintenance is only be performed on machines when it is required. That is, just before failure is likely to occur. Several cost savings can be achieved, such as minimizing the time the equipment is being maintained, minimizing the production hours lost to maintenance, and minimizing the cost of spare parts and supplies.

These cost savings come at a price, however. Some condition monitoring techniques are expensive and require specialist and experienced personnel for data analysis to be effective. In addition, a number of challenges need to be addressed for algorithms to perform optimally. A well-known problem related to predictive maintenance is that the failure records may be very rare and infrequent, giving rise to the problem of classifications with extremely unbalanced (rare) classes.

"Rare events" are those events that occur very infrequently and are subsequently very hard to detect. However, such rare events are normally associated with very high cost. Examples of rare events include fraud events in credit card activities or insurance claims, security breaches, and machinery failures. Two related aspects make discovery of such events to become more difficult. First, due to their very nature of being rare events, the training data does not contain many examples of such events. And given that such events are rather complex, it is usually difficult to generalize them from few available examples. In addition, depending on how classification algorithms are configured and what underlying cost functions are used, these algorithms and functions might completely ignore the rare class. Therefore, special attention should be additionally given to the choice of performance metric used for classification tasks with unbalanced classes. For example, if absolute accuracy is used as the assessment metric for a predictive maintenance detection model, a naive classifier who classifies all records as "False" may have an absolute accuracy of 99.99%, but it does not capture or provide useful information about the rare events.

Example techniques are described for detecting abnormities in predictive maintenance in an IoT network. The example techniques can help identify abnormity even if the abnormity is a rare event. For example, in some predictive maintenance applications, various sensor readings are used as features (or input variables) to predict whether or not a given machine is going to fail soon. In these cases, the target variable can be considered as the status of the machine (e.g., fail versus normal). Instead of focusing on the target variable, the example techniques can identify and leverage correlations between the features and use the inter-feature or inter-variable correlations to predict the target variable and identify abnormity. For example, the example techniques can monitor multiple sensors associated with a machine and predict the status of the machine based on a systematic behaviour of the multiple sensors.

The example techniques can improve prediction accuracy than traditional data mining approaches (i.e., trying to estimate the target variable without exploring the inter-variable mechanics). In some implementations, the example techniques can break a dataset that includes a large number of features into one or more clusters of correlated features. As such, the example techniques can divide the large dataset into more manageable subsets, leading to simpler and more accurate models. The clusters can be analyzed sequentially or in parallel, providing more flexibility, better scalability, and performance gains such as saving in computation time. In some implementations, the example techniques can be implemented in a distributed fashion, making it possible to benefit from parallel processing. The example techniques can achieve additional or different advantages.

FIG. 1 is a table illustrating an example dataset 100 including multiple data records for detecting anomalies in an IoT network according to an implementation. The data set 100 includes a number of data records 110, 120, 130, etc. Each data record includes a number of features (or input variables) and a target variable. As shown in FIG. 1, the features of the data set 100 include multiple sensor readings 101, 102, 103, 104, and 106, and the target variable 107 includes an indication of a machine's status: ok or fail. As an example, the data record 110 includes sensor reading values 111, 112, 113, 114, 115, and 116 that are associated to a target variable 117 indicating that the machine is going to be ok. As another example, the data record 130 includes sensor reading values 131, 132, 133, 134, 135, and 136 that are associated to a target variable 137 indicating that the machine is going to fail.

In some manufacturing environments, some or all of the input variables (e.g., the sensor readings 101, 102, 103, 104, and 106) are correlated with each other. For example, a sensor reading at one part of a given machine (e.g., temperature or pressure) could be highly correlated to the reading of another sensor from another part of that machine. In such cases, establishing that the sensors are out of synchronization can be a very useful method to predict machine failures.

In some implementations, to explore information that input variables can reveal, a baseline correlation profile can be established. The correlation profile can be built, for example, using only non-failure data records. The correlation profile can explain how different input variables are correlated. In most cases, there are plenty of non-failure data records available. As such, the constructed correlation profile can be statistically significant and reliable.

Based on the correlation profile, clusters of correlated input variables can be identified. Once the clusters of correlated input variables are identified, for each set of variables belonging to each of the clusters, a number of predictive models are constructed. For each cluster, the model seeks to predict the value of any of the input variables based on the value of other input variables belonging to that cluster. Since these input variables are highly correlated, the model can produce estimations with reasonably good accuracy. By estimating input variables using the normal (non-failure) data records, abnormal data records can be detected by comparing the observed input variables against the estimated values.

In some implementations, for each data record, the input variables belonging to any of the clusters are estimated based on the value of the other input variables in their cluster. Subsequently, a normalized distance or other error measure between the estimated and observed values of those input variables are computed. The higher this normalized measure, the higher the chance that the sensor inputs are out of synchronization, implying the higher chance of anomaly. Similarly, more input variables estimated to be out of synchronization, the higher the chance of machine failures and anomaly.

In some implementations, prediction of anomaly may depend on previous estimations. For example, if all of the previous time stamped predictions are marked as potentially anomaly, the recent prediction is also more likely to be an anomaly. In other words, detecting anomaly can include detecting a data record to be an abnormal data record in response to determining that a number of previous time stamped data records are determined as abnormal data records. This can compensate for the cases that one or few sensors have random noise component in there reading for one or two measurements but it rather traces the cases when the correlations are consistently broken over the time (i.e., real anomaly).

FIG. 2 is a flow chart illustrating a method 200 for detecting anomalies in an IoT network according to an implementation. The example method 200 can be performed, for example, by the example computer or computer system as described with respect to FIG. 5, or any other suitable system, environment, software, and hardware, or a combination of systems, environments, software, and hardware as appropriate. In some implementations, various steps of method 200 can be run in parallel, in combination, in loops, and/or in any order.

At 210, a dataset of a number of data records is received, for example, by operation of a computer system. Each of the number of data records (also referred to as observations) includes a number of features and a target variable. The number of features and target variable can include information of a manufacturing environment. For example, the target variable can be, for example, an indication of normal status (e.g., ok) or abnormal (e.g., failure or error) of a machine. A data record that has a target variable indicating a normal status can be referred to as a normal data record; a data record that has a target variable indicating an abnormal status can be referred to as an abnormal data record. A dataset can include normal data records, abnormal data records, or a combination of both. In some instances, the abnormal data records can correspond to rare events so that the number of abnormal data records can be significantly smaller than the number of the normal data records. Example dataset can be the dataset 100 in FIG. 1 or another dataset. From 210, method 200 proceeds to 220.

At 220, a set of normal data records of the dataset can be identified, for example, based on the target variable. The set of normal data records can be identified by filtering out abnormal data records from the dataset. The set of normal data records can include all or a subset of all the normal data records in the received dataset. In some implementations, the number of normal data records in the set of normal data records is statistically sufficient so as to identify inter-feature correlations of the data records. From 220, method 200 proceeds to 230.

At 230, correlation analysis can be performed on the set of normal data records, for example, by operation of the computer system. Correlation analysis can be performed to identify correlations between or among features of the normal data records. Example correlation analysis can include computing correlations, correlation coefficients, covariance, or other correlation metrics of two or more features. In some implementations, correlation analysis can include performing Spearman's rank correlation coefficient, partial correlations, inverse correlations, pairwise correlations; covariance matrices etc. In some implementations, a correlation profile can be built based on the correlation analysis of the normal data records. The correlation profile can include, for example, values of the correlation metrics, a ranking of correlation values, values of covariance metrics etc. With the correlation analysis, anomaly can be detected based on the inter-feature correlations for predictive maintenance. From 230, method 200 proceeds to 240.

At 240, one or more clusters of correlated features are identified, for example, by operation of the computer system. In some implementations, clusters of correlated input variables can be identified based on the correlation profile. Various techniques can be used to identify the clusters, such as threshold-based techniques or other grouping or clustering algorithms such as k-means clustering, hierarchical clustering methods, Density Based Clustering (DBSCAN), Gaussian mixture Density Decomposition (GMMD), Fuzzy c-means etc. For example, a threshold-base technique can consider a set of features $v_1, v_2, \ldots, v_n$ to form a cluster if and only if the correlation between any pair of such variables exceeds a minimum threshold. In some implementations, domain knowledge and user input can be used to identify the clusters of correlated features. For example, if several sensors are known to be co-located or otherwise highly correlated based on empirical knowledge, the readings of the several sensors can be identified as a cluster of correlated features. Identification of the clusters of correlated features can help understand how different features are correlated and this knowledge can then be used to detect anomaly.

In some implementations, the features of the data records may include only one cluster of correlated features. In some implementations, two or more clusters of correlated features can be identified from all the features of the data records. The two or more clusters can be identified, for example, based on different ranges of correlation values between or among the features. The features in the two or more clusters can be mutually exclusive or they can overlap (e.g., one feature might be included in two or more clusters). From 240, method 200 proceeds to 250.

At 250, for a cluster of correlated features, a model can be built based on the features in the cluster, for example, by operation of the computer system. Unlike existing techniques that build models focused on the target variable, the model can represent relationships among features, without considering the target variable. For example, the model can estimate or predict a first feature in the cluster of correlated features based on one or more other features in the cluster of correlated features. The model can be built, for example, using regression or other data mining algorithms. The model can be a linear model, a non-linear model, or another type of model.

In some implementations, a respective model is built for each feature in the cluster of correlated features based on other features in cluster of correlated features. In the case of multiple clusters of correlated features, a respective model can be built for each feature in each of the multiple clusters. For example, a second cluster of correlated features can be identified based on the inter-feature correlations of the set of normal data records, and a second model can be built that determines a second feature in the second cluster of correlated features based on one or more other features in the second cluster of correlated features. From 250, method 200 proceeds to 260.

At 260, a data record can be received, for example, by operation of the computer system. The data record can be one of the data records in the dataset received at 210, or the data record can be a new data record that needs to predict the target variable. For example, the data record can be sensor readings of the machines that are received in real time, periodically, or from time to time. The data record can include observed values of the features (e.g., actual or raw values or calibrated values from data observations or data samples). For example, the data record can include a respective value of features in each of the one or more clusters of the correlated features. The observed values of some features can be used to determine estimated values of other features. From 260, method 200 proceeds to 270.

At 270, an estimated value of the first feature can be determined according to the model based on the values of the one or more other features in the cluster of correlated features, for example, by operation of the computer system. The estimated values of the first feature can be determined, for example, by plugging into the model the values of one or more other features in the cluster of correlated features.

In some implementations, the estimation can be performed for each feature in each of the one or more clusters of correlated features. For instance, for each feature besides the first feature in the cluster of correlated features, a respective model can be built that estimates the feature based on one or more features other than the feature in the cluster of correlated features; and an estimated value of the feature can be determined according to the respective model based on the observed values of the one or more other features other than the feature in the cluster of correlated features.

In the case of multiple clusters of correlated features, for example, a second data record can be received that includes an observed value of the second feature and observed values of the one or more other features in the second cluster of correlated features. The second data record can be the first data record or a new data record. An estimated value of the second feature can be determined based on the values of the one or more other features in the second cluster of correlated features. From 270, method 200 proceeds to 280.

At 280, the estimated value of the first feature is compared with the observed value of the first feature, for example, by operation of the computer system. In some implementations, comparing the estimated value of the first feature with the observed value of the first feature includes computing error measure between the estimated value of the first feature with the observed value of the first feature. The error measure can include, for example, one or more of a difference, an absolute difference, a square error, a normalized distance, or other error measures (including either normalized or un-normalized measures). As an example, the normalized distance can be computed by dividing an absolute difference between the observed value of the first feature and estimated value of the first feature by the standard deviation of the first feature. Other variations or techniques can be used to compute the normalized distance.

In some implementations, the error measure (e.g., the difference, an absolute difference, or the normalized distance) can be compared with a threshold to determine whether the observed value of the first feature and estimated value of the first feature are close enough. For example, if the normalized distance is less than a certain threshold, then the estimated value can be considered as a normal value that is within a tolerable range of around the estimated value of the first feature. Additional or different approaches can be used to compare the estimated value of the first feature and the observed value of the first feature.

In some implementations, the comparison can be performed for each feature in each of the one or more clusters of correlated features. For example, the estimated value of the second feature can be compared with the observed value of the second feature in the second cluster of correlated features. The comparison results of one or more correlated features can be used to detect anomaly in 290. From 280, method 200 proceeds to 290.

At 290, anomaly can be determined based on the comparison, for example, by operation of the computer system. In some implementations, determining anomaly can include determining whether the data record is a normal data record or an abnormal data record based on the comparison.

In some implementations, determining whether the data record is a normal data record or an abnormal data record based on the comparison includes determining a probability or likelihood of anomaly of the data record. The probability or likelihood of anomaly can be determined based on the comparison of the estimated value of one or more features (e.g., some particular features or all features) in the one or more clusters of correlated features. For example, the probability of anomaly can be configured with an initial value (e.g., 0) and be incremented whenever a respective error measure (e.g., normalized distance) between an estimated value of a feature and an observed value of the feature exceeds a respective threshold.

In some implementations, after traversing all features in the one or more clusters of correlated features, the resulting probability of anomaly can be compared with a threshold. The data record can be considered as a normal data record in response to determining that the resulting probability of anomaly is less than the threshold; and data record can be considered as an abnormal data record in response to determining that the resulting probability of anomaly equals or exceeds the threshold.

In some implementations, whether the data record is a normal data record or an abnormal data record can be determined based on the comparison without determining a probability or likelihood of anomaly of the data record. For example, determining whether the data record is a normal data record or an abnormal data record based on the comparison can include determining that the data record is a normal data record in response to determining the normalized distance between the estimated value of the first feature with the observed value of the first feature is less than a threshold; or determining that the data record is an abnormal data record in response to determining the normalized distance between the estimated value of the first feature with the observed value of the first feature is no less than the threshold.

In some implementations, determining whether the data record is a normal data record or an abnormal data record based on the comparison includes determining that the data record is a normal data record in response to determining the observed value of the first feature equals or is within a tolerance range of the estimated value of the first feature; or determining that the data record is an abnormal data record in response to determining the observed value of the first feature does not equal or is outside a tolerance range of the estimated value of the first feature.

In some implementations, determining whether the data record is a normal data record or an abnormal data record based on the comparison includes determining that the data record is a normal data record or an abnormal data record based on the comparisons of multiple features. The data record can be regarded as an abnormal data record when at least one of the multiple features that deviate from tolerable range of the estimated value, or at least a combination of certain features that deviate from respective tolerable ranges of the respective estimated values. For example, determining whether the data record is a normal data record or an abnormal data record can include determining that the data record is an abnormal data record in response to determining that at least one of the observed value of the first feature is outside a first tolerance range of the estimated value of the first feature; or the observed value of the second feature is outside a second tolerance range of the estimated value of the second feature. Additional or different criteria and approaches can be used to detect anomaly based on the comparison of estimated feature values and observed features values. From 290, method 200 proceeds to 295.

At 295, impact of a deviation from an estimated value of a feature in the cluster of correlated features on the target variable can be determined, for example, by operation of the computer system. In some implementations, an impact model can be constructed to represent the relationship between the target variable and the respective value deviations of the features from the estimated values of the features, for example, using a supervised learning approach. For instance, the impact model can be built where input variables are the normalized distance or other error measures of the original features of the data records while the target variable indicates a normal or abnormal status of a machine. One example advantage of this approach is that the impact model can automatically identify that the deviations of which features are more critical as it might be that fluctuations of some of the sensors may be directly related to the failure of the machine while others may have less impact. With the knowledge of the critical features, in some implementations, only the critical features or a subset of critical features are used to detect anomaly by estimating and comparing only these selected critical features. As such, the computation complexity can be further reduced and the computational efficiency can be improved without scarifying much accuracy. After 270, method 200 ends.

Figure 3:
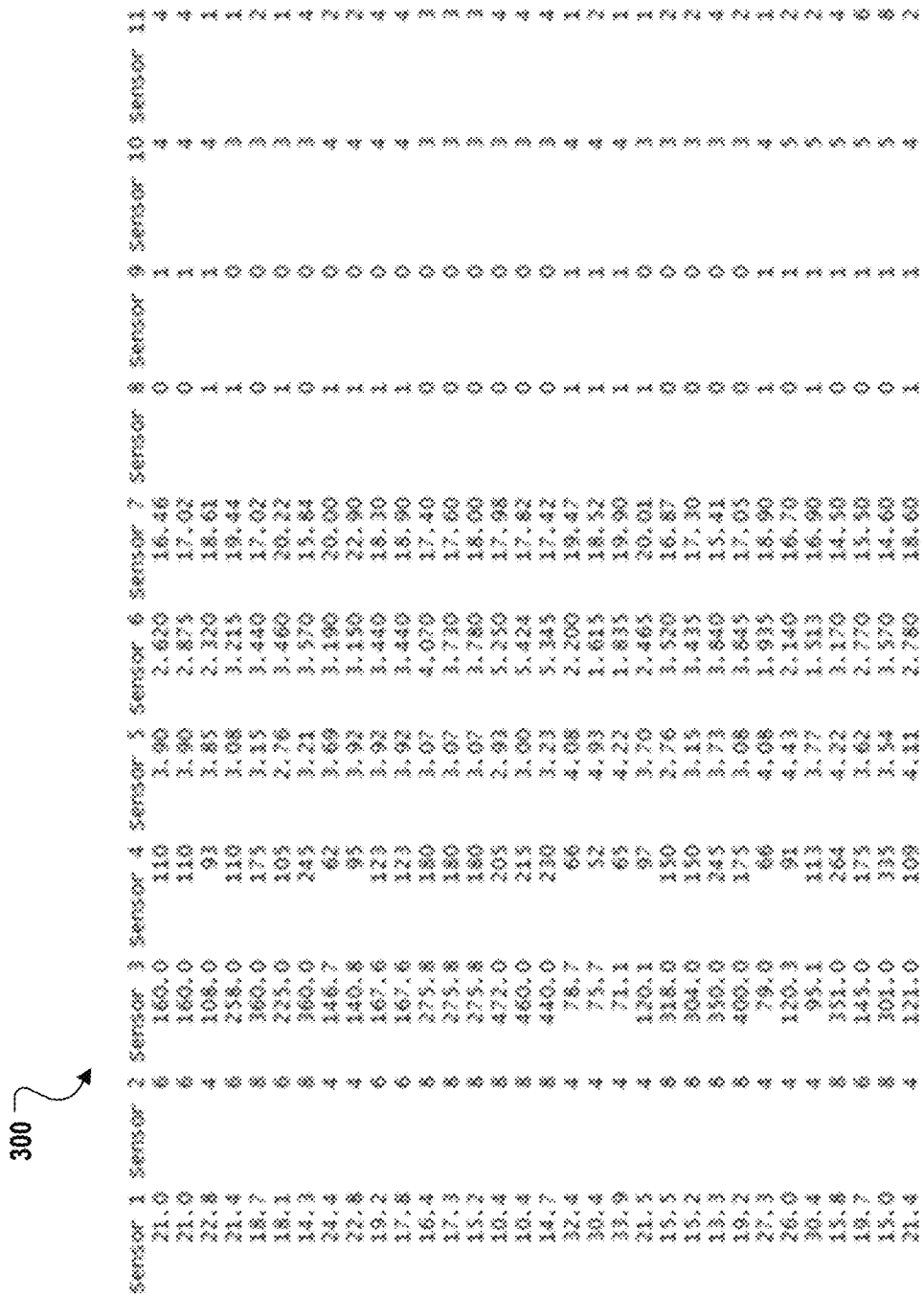
FIG. 3 is a table illustrating an example set of data records that all correspond to normal operation mode of a machine as part of an IoT network according to an implementation.

FIG. 3 FIG. 3 is a table illustrating an example set of data records 300 that all correspond to normal operation mode of a machine as part of an IoT network according to an implementation. As illustrated in table 300, each data record includes eleven sensor readings. The example dataset 300 can be the set of normal data records after filtering out abnormal data records according to the example operation 220 of the example method 200.

Figure 4:
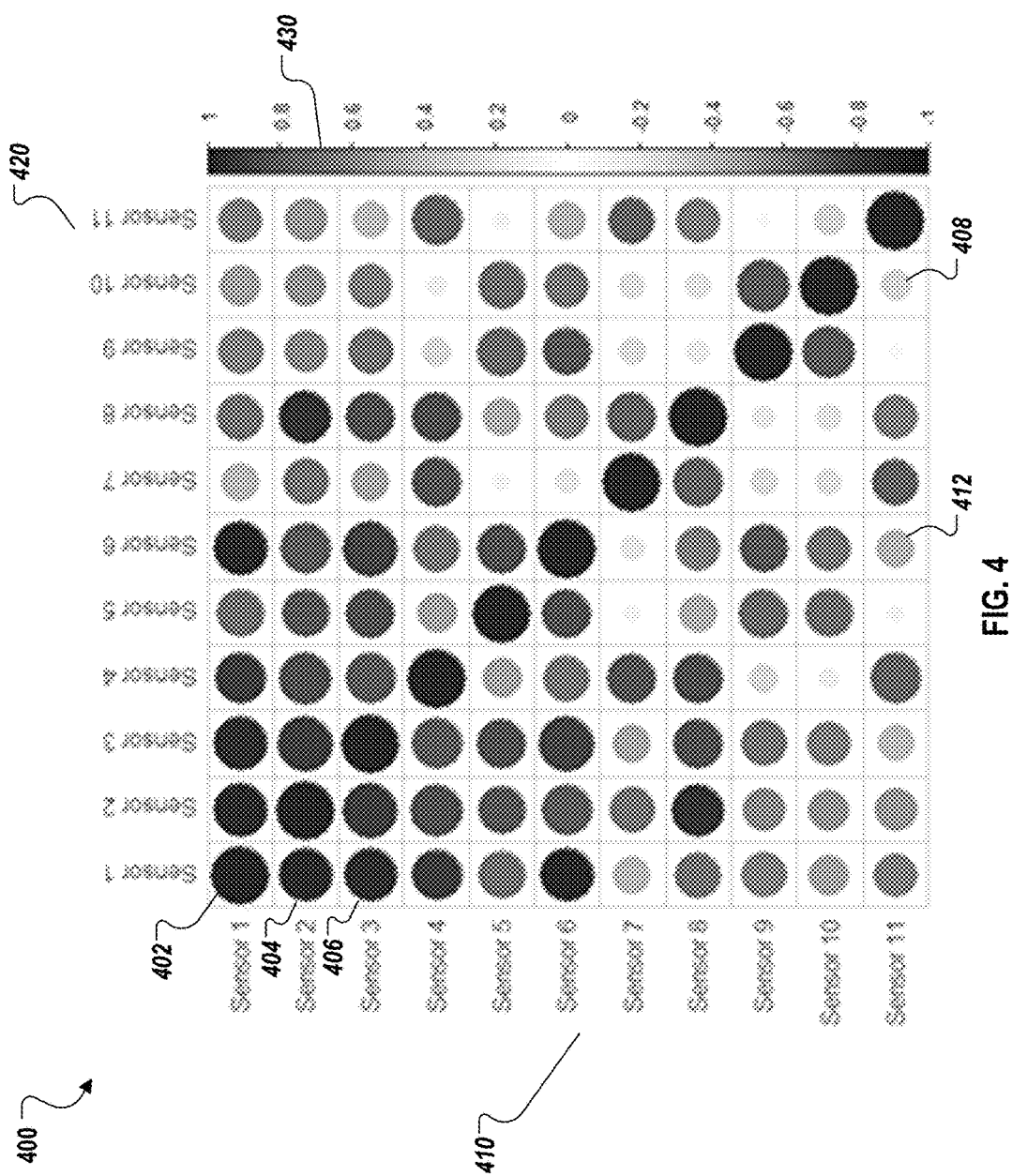
FIG. 4 is a data plot illustrating example inter-feature correlations according to an implementation.

FIG. 4 is a data plot illustrating example inter-feature correlations 400 of the example dataset 300 of FIG. 3 according to an implementation. The rows 410 and columns 420 each contain the above-mentioned eleven sensor readings. Circles (e.g., circles 402, 404, 406, 408, and 412) at the intersections of columns and rows indicate the correlation between the sensor readings. In some implementations, the larger the size and darker the circle, the higher the correlation between the sensor readings as indicated by the bar 430. The example inter-feature correlations 400 can be obtained, for example, after performing a correlation analysis according to the example operation described with respect to 230 of the example method 200. Clusters of correlated variables can be identified based on the inter-feature correlations 400.

As an example, the set of {Sensor 2, Sensor 3, Sensor 4} can be considered as one cluster. Models can be built that can estimate each of the input variables within the cluster based on other variables in the cluster. The below code shows an example of using a linear model to estimate the values of Sensor 3 based on the values of Sensor 4 and Sensor 2:

| Call: |
|---|
| lm(formula = Sensor3~Sensor4 + Sensor2, data = LL2) |

| Residuals: | | | | |
|---|---|---|---|---|
| Min | 1Q | Median | 3Q | Max |
| −82.074 | −47.212 | −7.208 | 22.890 | 127.726 |

| Coefficients: | | | | |
|---|---|---|---|---|
| | Estimate | Std. | Error | t value | pr(>|t|) |
| (intercept) | −144.5694 | 37.6522 | −3.840 | 0.000617 | *** |
| Sensor4 | 0.2358 | 0.2578 | 0.915 | 0.367895 | |
| Sensor2 | 55.0626 | 9.8975 | 5.563 | 5.31e−06 | *** |

| Signif. codes: | 0 | '*' 0.001 | '' 0.01 | '*' 0.05 | '.' 0.1 | ' ' 1 |

Residual standard error: 54.53 on 29 degrees of freedom
Multiple R-squared: 0.8189, Adjusted R-squared: 0.8064
F-statistic: 65.56 on 2 and 29 DF, p-value: 1.739e−11

Based on this linear model, the values of Sensor 3 can be estimated according to the values of Sensors 4 and Sensor 2. Similarly, a model that can estimate values of Sensor 2 based on values of Sensor 3 and Sensor 4, and another model that can estimate values of Sensor 4 based on values of Sensor 2 and Sensor 3 can be constructed. Note that this example uses linear models while other models can be used in practice as well.

For any given data record, having the values of Sensor 3 estimated, the estimated versus observed values can be compared and error measures can be computed. In some implementations, the error measures can be normalized by dividing against the standard deviation of values of Sensor 3 (123.9387 in this example). The normalized error measures can be used to detect the anomalies, for example, according to the example operations described with respect 290 of the example method 200.

Figure 5:
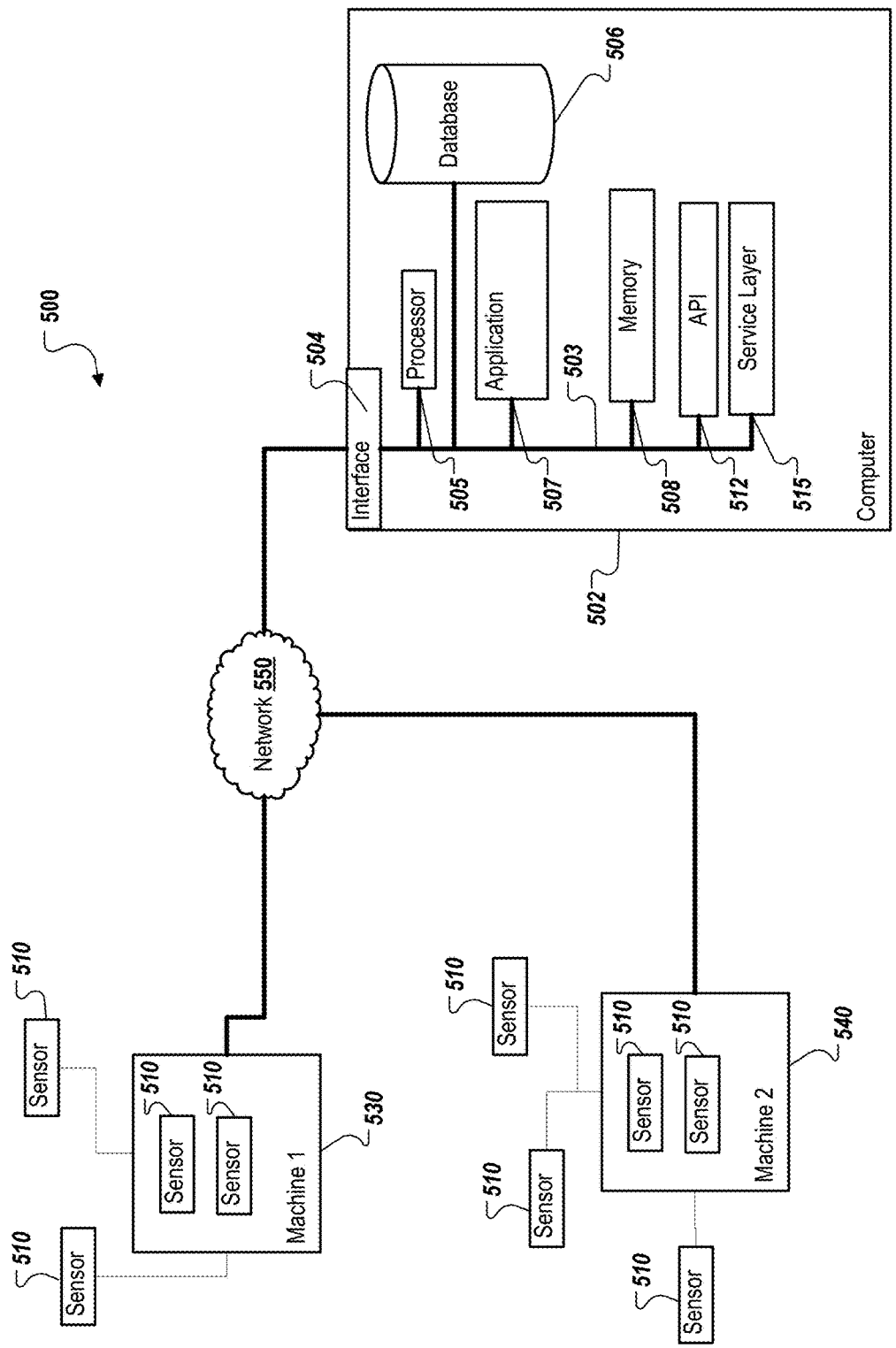
FIG. 5 is a block diagram of an example computer system that can be used for detecting anomalies in an IoT network according to an implementation.

FIG. 5 is a block diagram of an example computer system 500 configured to detect anomalies in an IoT network according to an implementation. The system 500 can represent an Internet of Things system that includes a computer 502, two example machines 530 and 540 that are connected via a network 550. The system 500 includes additional or different components (e.g., more machines or computers) or can be configured in a manner different from the example configuration of FIG. 5. The Internet of Things system 500 can allow wireless communications, wireline communications, machine-to-machine communications (M2M), or other types of communications.

The machines 530 and 540 can include devices, systems, equipment, or other objects and can be used in manufacturing environments (e.g., in a plant, a factory, or other locations), residence environments (e.g., homes or residence communities), transportation systems, energy management systems, medical and healthcare systems, or other systems. Each of the machines 530 and 540 can include or be otherwise coupled with one or more sensors 510. The sensors 510 can measure, for example, one or more of temperature, pressure, voltage, input, output, or other conditions of the machines 530 and 540. In some implementations, the multiple sensors 510 can form one or more wireless sensor networks.

In some implementations, readings of the multiple sensors 510 can be displayed, for example, at a dashboard of the machines 530 and 540. In some implementations, readings of the multiple sensors 510 can be recorded locally at the machines 530 and 540 or remotely (e.g., in cloud or another data store device). In some implementations, the readings of the sensors 110 can be transmitted to the computer 502 in real time, regularly, or from time to time. The readings of the sensors 110 can be used for archiving and analysis, such as, detecting anomalies in predictive maintenance.

The computer 502 can be a stand-alone computer system or a component of an example distributed computing system (EDCS, for example, a client-server system) for detecting anomalies in Internet of Things according to an implementation. The illustrated computer 502 can encompass any computing device such as a server, desktop computer, laptop/notebook computer, wireless data port, smart phone, personal data assistant (PDA), tablet computing device, one or more processors within these devices, or any other suitable processing device, including both physical and/or virtual instances of the computing device. Additionally, the computer 502 may comprise a computer that includes an input device, such as a keypad, keyboard, touch screen, or other device that can accept user information, and an output device that conveys information associated with the operation of the computer 502, including digital data, visual and/or audio information, or a GUI.

The computer 502 can process for/serve as a client, a server, a UI layer, an application, and/or any other component of the EDCS. The illustrated computer 502 is communicably coupled with the network 550. In some implementations, one or more components of the computer 502 may be configured to operate within a cloud-computing-based environment. For example, the computer 502 may be configured to receive sensor readings from the cloud. In some instances, the implementations of the example techniques described in this disclosure do not necessarily need the connection to the network.

At a high level, the computer 502 is an electronic computing device operable to receive, transmit, process, store, or manage data and information associated with the EDCS. According to some implementations, the computer 502 may also include or be communicably coupled with a cloud-computing server, application server, e-mail server, web server, caching server, streaming data server, business intelligence (BI) server, and/or other server.

The computer 502 can receive requests over network 550 from a client application (e.g., a mobile UI, web-based application UI, and/or a desktop application executing on this or another computer 502 in use by a customer) and respond to the received requests by processing the said requests in an appropriate software application. In addition, requests may also be sent to the computer 502 from internal users (e.g., from a command console or by other appropriate access method), external or third parties, other automated applications, as well as any other appropriate entities, individuals, systems, or computers.

Each of the components of the computer 502 can communicate using a system bus 503. In some implementations, any and/or all the components of the computer 502, both hardware and/or software, may interface with each other and/or the interface 504 over the system bus 503 using an API 512 and/or a service layer 515. The API 512 may include specifications for routines, data structures, and object classes. The API 512 may be either computer language-independent or -dependent and refer to a complete interface, a single function, or even a set of APIs. The service layer 515 provides software services to the computer 502 and/or the EDCS. The functionality of the computer 502 may be accessible for all service consumers using this service layer. Software services, such as those provided by the service layer 515, provide reusable, defined business functionalities through a defined interface. For example, the interface may be software written in JAVA, C++, or other suitable language providing data in extensible markup language (XML) format or other suitable format. While illustrated as an integrated component of the computer 502, alternative implementations may illustrate the API 512 and/or the service layer 515 as stand-alone components in relation to other components of the computer 502 and/or EDCS. Moreover, any or all parts of the API 512 and/or the service layer 515 may be implemented as child or sub-modules of another software module, enterprise application, or hardware module without departing from the scope of this disclosure.

The computer 502 includes an interface 504. Although illustrated as a single interface 504 in FIG. 5, two or more interfaces 504 may be used according to particular needs, desires, or particular implementations of the computer 502 and/or EDCS. The interface 504 is used by the computer 502 for communicating with other systems in a distributed environment—including within the EDCS—connected to the network 150. Generally, the interface 504 comprises logic encoded in software and/or hardware in a suitable combination and operable to communicate with the network 150. More specifically, the interface 504 may comprise software supporting one or more communication protocols associated with communications such that the network 150 or interface's hardware is operable to communicate physical signals within and outside of the illustrated EDCS.

The computer 502 includes a processor 505. Although illustrated as a single processor 505 in FIG. 5, two or more processors may be used according to particular needs, desires, or particular implementations of the computer 502 and/or the EDCS. Generally, the processor 505 executes instructions and manipulates data to perform the operations of the computer 502. Specifically, the processor 505 executes the functionality required for detecting anomalies in Internet of Things.

The computer 502 can also include a database 506 and memory 508 that hold data for the computer 502 and/or other components of the EDCS. Although illustrated as a single database 506 and memory 508 in FIG. 5, two or more databases 506 and memories 508 may be used according to particular needs, desires, or particular implementations of the computer 502 and/or the EDCS. While database 506 and memory 508 are illustrated as integral components of the computer 502, in alternative implementations, the database 506 and memory 508 can be external to the computer 502 and/or the EDCS. In some implementations, the database can be a conventional database or an in-memory database, or a mix of both. In some implementations, the database 506 and memory 508 can be combined into one component. The database 506 and memory 508 can store datasets on which the example techniques described with respect to FIGS. 1-4 are performed for detecting anomalies in Internet of Things. For instance, the database 506 and memory 508 can store historic and current readings of the sensor 510 of the one or more machines 530 and 540. In some implementations, the database is not mandatory, e.g. the data may be located in flat files or in memory, after getting them from an I/O device. Additionally or differently, volatile and/or un-volatile memory can be used.

The application 507 is an algorithmic software engine providing functionality according to particular needs, desires, or particular implementations of the computer 502 and/or the EDCS, particularly with respect to functionalities required for detecting anomalies in Internet of Things. Further, although illustrated as a single application 507, the application 507 may be implemented as multiple applications 507 on the computer 502. In addition, although illustrated as integral to the computer 502, in alternative implementations, the application 507 can be external to the computer 502 and/or the EDCS.

There may be any number of computers 502 associated with, or external to, the EDCS and communicating over network 150. Further, the terms "client," "user," and other appropriate terminology may be used interchangeably as appropriate without departing from the scope of this disclosure. Moreover, this disclosure contemplates that many users may use one computer 502, or that one user may use multiple computers 502.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The terms "data processing apparatus," "computer," and/or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, e.g., a central processing unit (CPU), a graphical processing unit (GPU), an FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example LINUX, UNIX, WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, a GPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM) or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a global positioning system (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto-optical disks; and CD-ROM, DVD+/-R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), LED (Light Emitting Diode), or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware and/or software, may interface with each other and/or the interface using an application programming interface (API) and/or a service layer. The API may include specifications for routines, data structures, and object classes. The API may be either computer language-independent or -dependent and refer to a complete interface, a single function, or even a set of APIs. The service layer provides software services to the computing system. The functionality of the various components of the computing system may be accessible for all service consumers using this service layer. Software services provide reusable, defined business functionalities through a defined interface. For example, the interface may be software written in JAVA, C++, or other suitable language providing data in extensible markup language (XML) format or other suitable format. The API and/or service layer may be an integral and/or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation and/or integration of various system modules and components in the implementations described above should not be understood as requiring such separation and/or integration in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results.

Accordingly, the above description of example implementations does not define or constrain this disclosure. Other changes, substitutions, and alterations are also possible without departing from the spirit and scope of this disclosure.

What is claimed is:

1. A computer-implemented method comprising:
receiving, by operation of a computer system, a dataset of a plurality of data records, each of the plurality of data records comprising a plurality of features and a target variable associated with the plurality of features, each feature of the plurality of features representing a reading of a separate sensor coupled to a machine and measuring a condition of the machine, and the target variable representing a status of the machine;
identifying a set of normal data records from the dataset based on the target variable;
identifying inter-feature correlations by performing correlation analysis on the set of normal data records; and
performing predictive maintenance on the machine based on a detection of an anomaly based on the inter-feature correlations for predictive maintenance, wherein the detection of the anomaly comprises:
identifying a cluster of correlated features based on the inter-feature correlations;
building a model that estimates a first feature in the cluster of correlated features based on one or more other features in the cluster of correlated features;
receiving a data record that includes an observed value of the first feature and observed values of the one or more other features in the cluster of correlated features;
determining an estimated value of the first feature according to the model based on the values of the one or more other features in the cluster of correlated features;
comparing the estimated value of the first feature with the observed value of the first feature; and
determining whether the data record is a normal data record or an abnormal data record based on the comparison.

2. The method of claim 1, wherein detecting an anomaly further comprises detecting a data record to be an abnormal data record in response to determining that a number of previous time stamped data records are determined as abnormal data records.

3. The method of claim 1, wherein determining whether the data record is a normal data record or an abnormal data record based on the comparison comprises determining a probability of anomaly of the data record based on the comparison.

4. The method of claim 1, wherein comparing the estimated value of the first feature with the observed value of the first feature comprises computing an error measure between the estimated value of the first feature with the observed value of the first feature.

5. The method of claim 4, further comprising:
building an impact model that represents a relationship between the target variable and the respective error measure of each feature in the cluster of correlated features; and
identifying impact of a deviation from an estimated value of a feature in the cluster of correlated features on the target variable.

6. The method of claim 4, wherein determining whether the data record is a normal data record or an abnormal data record based on the comparison comprises:
increasing a probability of anomaly of the data record in response to determining the error measure between the estimated value of the first feature with the observed value of the first feature exceeds a threshold.

7. The method of claim 1, further comprising:
for each feature besides the first feature in the cluster of correlated features:
building a respective model that estimates the feature based on one or more features other than the feature in the cluster of correlated features;
determining an estimated value of the feature according to the respective model based on observed values of the one or more other features other than the feature in the cluster of correlated features;
comparing the estimated value of the feature with the observed value of the feature; and
determining whether the data record is a normal data record or an abnormal data record based on the comparison.

8. The method of claim 1, further comprising:
identifying a second cluster of correlated features based on the inter-feature correlations of the set of normal data records;
building a second model that determines a second feature in the second cluster of correlated features based on one or more other features in the second cluster of correlated features;
receiving a second data record that includes an observed value of the second feature and observed values of the one or more other features in the second cluster of correlated features;
determining an estimated value of the second feature based on the values of the one or more other features in the second cluster of correlated features;
comparing the estimated value of the second feature with the observed value of the second feature; and
determining whether the data record is a normal data record or an abnormal data record based on the comparison.

9. The method of claim 8, wherein determining whether the data record is a normal data record or an abnormal data record comprises determining that the data record is an abnormal data record in response to determining that at least one of:
the observed value of the first feature is outside a first tolerance range of the estimated value of the first feature; or
the observed value of the second feature is outside a second tolerance range of the estimated value of the second feature.

10. A non-transitory, computer-readable medium storing computer-readable instructions executable by a computer and configured to perform operations comprising:
receiving, by operation of a computer system, a dataset of a plurality of data records, each of the plurality of data records comprising a plurality of features and a target variable associated with the plurality of features, each feature of the plurality of features representing a reading of a separate sensor coupled to a machine and measuring a condition of the machine, and the target variable representing a status of the machine;
identifying a set of normal data records from the dataset based on the target variable; identifying inter-feature correlations by performing correlation analysis on the set of normal data records; and
performing predictive maintenance on the machine based on a detection of an anomaly based on the inter-feature correlations for predictive maintenance, wherein the detection of the anomaly comprises:
identifying a cluster of correlated features based on the inter-feature correlations;
building a model that estimates a first feature in the cluster of correlated features based on one or more other features in the cluster of correlated features;
receiving a data record that includes an observed value of the first feature and observed values of the one or more other features in the cluster of correlated features;
determining an estimated value of the first feature according to the model based on the values of the one or more other features in the cluster of correlated features;
comparing the estimated value of the first feature with the observed value of the first feature; and
determining whether the data record is a normal data record or an abnormal data record based on the comparison.

11. The medium of claim 10, wherein comparing the estimated value of the first feature with the observed value of the first feature comprises computing an error measure between the estimated value of the first feature with the observed value of the first feature, and the operations further comprising:
building an impact model that represents a relationship between the target variable and the respective error measure of each feature in the cluster of correlated features; and
identifying impact of a deviation from an estimated value of a feature in the cluster of correlated features on the target variable.

12. The medium of claim 11, the operations further comprising:
for each feature besides the first feature in the cluster of correlated features:
building a respective model that estimates the feature based on one or more features other than the feature in the cluster of correlated features;
determining an estimated value of the feature according to the respective model based on observed values of the one or more other features other than the feature in the cluster of correlated features;
comparing the estimated value of the feature with the observed value of the feature; and
determining whether the data record is a normal data record or an abnormal data record based on the comparison.

13. The medium of claim 11, the operations further comprising:
- identifying a second cluster of correlated features based on the inter-feature correlations of the set of normal data records;
- building a second model that determines a second feature in the second cluster of correlated features based on one or more other features in the second cluster of correlated features;
- receiving a second data record that includes an observed value of the second feature and observed values of the one or more other features in the second cluster of correlated features;
- determining an estimated value of the second feature based on the values of the one or more other features in the second cluster of correlated features;
- comparing the estimated value of the second feature with the observed value of the second feature; and
- determining whether the data record is a normal data record or an abnormal data record based on the comparison.

14. A system, comprising:
- a memory;
- at least one hardware processor interoperably coupled with the memory and configured to perform operations comprising:
  - receiving, by operation of a computer system, a dataset of a plurality of data records, each of the plurality of data records comprising a plurality of features and a target variable associated with the plurality of features, each feature of the plurality of features representing a reading of a separate sensor coupled to a machine and measuring a condition of the machine, and the target variable representing a status of the machine;
  - identifying a set of normal data records from the dataset based on the target variable;
  - identifying inter-feature correlations by performing correlation analysis on the set of normal data records; and
  - performing predictive maintenance on the machine based on a detection of an anomaly based on the inter-feature correlations for predictive maintenance, wherein the detection of the anomaly comprises:
    - identifying a cluster of correlated features based on the inter-feature correlations;
    - building a model that estimates a first feature in the cluster of correlated features based on one or more other features in the cluster of correlated features;
    - receiving a data record that includes an observed value of the first feature and observed values of the one or more other features in the cluster of correlated features;
    - determining an estimated value of the first feature according to the model based on the values of the one or more other features in the cluster of correlated features;
    - comparing the estimated value of the first feature with the observed value of the first feature; and
    - determining whether the data record is a normal data record or an abnormal data record based on the comparison.

15. The system of claim 14, wherein comparing the estimated value of the first feature with the observed value of the first feature comprises computing an error measure between the estimated value of the first feature with the observed value of the first feature; and wherein determining whether the data record is a normal data record or an abnormal data record based on the comparison comprises increasing a probability of anomaly of the data record in response to determining the error measure between the estimated value of the first feature with the observed value of the first feature exceeds a threshold.

16. The system of claim 14, the operations further comprising:
- for each feature besides the first feature in the cluster of correlated features:
  - building a respective model that estimates the feature based on one or more features other than the feature in the cluster of correlated features;
  - determining an estimated value of the feature according to the respective model based on observed values of the one or more other features other than the feature in the cluster of correlated features;
  - comparing the estimated value of the feature with the observed value of the feature; and
  - determining whether the data record is a normal data record or an abnormal data record based on the comparison.

17. The system of claim 14, the operations further comprising:
- identifying a second cluster of correlated features based on the inter-feature correlations of the set of normal data records;
- building a second model that determines a second feature in the second cluster of correlated features based on one or more other features in the second cluster of correlated features;
- receiving a second data record that includes an observed value of the second feature and observed values of the one or more other features in the second cluster of correlated features;
- determining an estimated value of the second feature based on the values of the one or more other features in the second cluster of correlated features;
- comparing the estimated value of the second feature with the observed value of the second feature; and
- determining whether the data record is a normal data record or an abnormal data record based on the comparison, wherein determining whether the data record is a normal data record or an abnormal data record comprises determining that the data record is an abnormal data record in response to determining that at least one of:
  - the observed value of the first feature is outside a first tolerance range of the estimated value of the first feature; or
  - the observed value of the second feature is outside a second tolerance range of the estimated value of the second feature.

* * * * *